May 8, 1962 U. OPRECHT 3,032,989
GAS TURBINE POWER PLANT
Filed Nov. 12, 1958
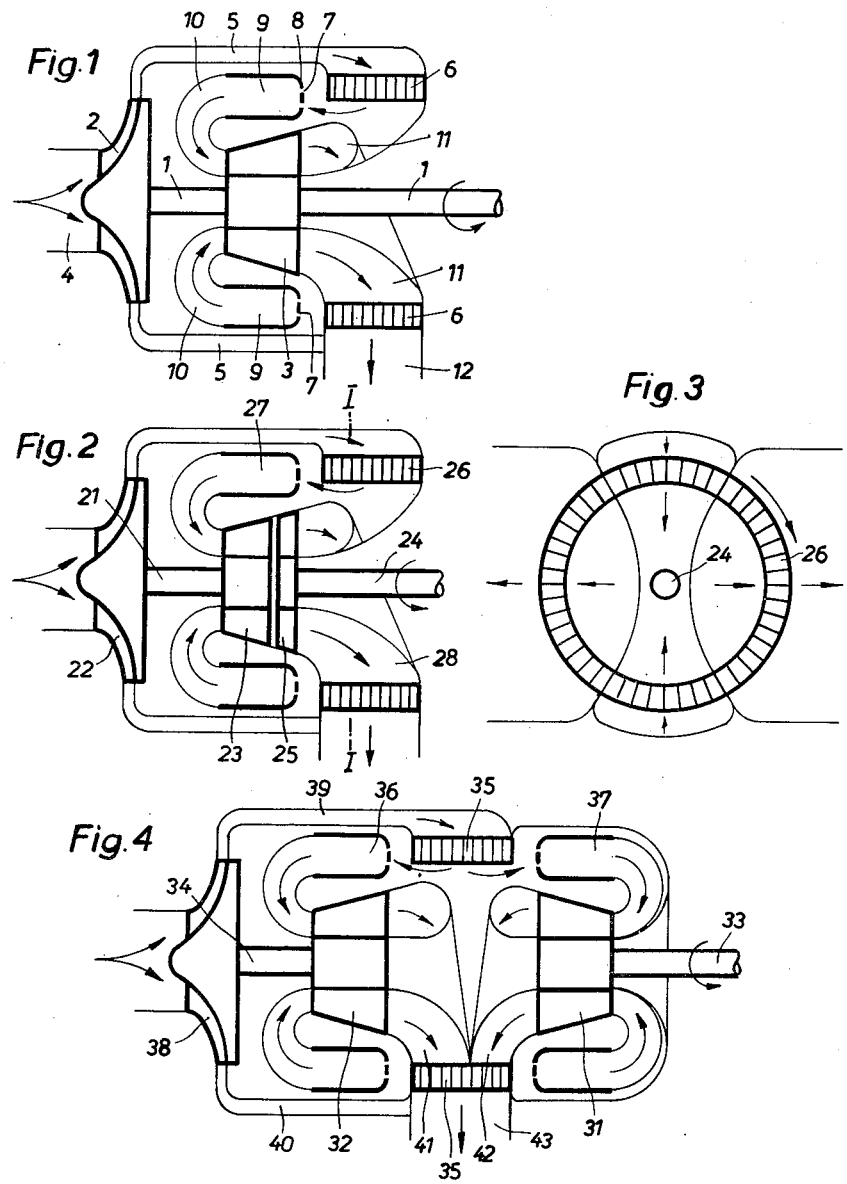
INVENTOR:
ULRICH OPRECHT United States Patent Office 3,032,989
Patented May 8, 1962

3,032,989
GAS TURBINE POWER PLANT
Ulrich Oprecht, Buchs, Switzerland, assignor to Adolph Saurer, Ltd., Arbon, Switzerland
Filed Nov. 12, 1958, Ser. No. 773,488
Claims priority, application Switzerland Nov. 14, 1957
1 Claim. (Cl. 60—39.51)

This invention relates to power plants, and more particularly to gas turbine power plants, including drum-shaped heat exchangers operating on the regeneration principle, and at least one annular combustion chamber.

It is an object of the present invention to provide gas turbine power plants, wherein the gases, following their expansion, and in the course of their passage into the heat exchanger, are deflected only once.

Other objects, and the manner in which the same are attained, will become apparent as this specification proceeds.

The invention contemplates to provide gas turbine power plants, wherein the heat exchanger and the annular combustion chamber are arranged coaxially to the axis of the gas turbine plant, the arrangement being designed to permit the gases, following their expansion, to be passed into the heat exchanger with a single deflection only. Preferably, the inner diameter of the annular combustion chamber exceeds the inlet diameter of the correlated turbine fed from said chamber. Preferably also, the outer diameter of the heat exchanger is at least approximately equal to the outer diameter of the annular combustion chamber. The compressor turbine and the power turbine can be fed from separate combustion chambers.

In the drawing accompanying this specification and forming part thereof, several embodiments of gas turbine power plants according to the invention are illustrated diagrammatically by way of example.

In the drawings:

FIG. 1 is a schematic cross-section of a gas turbine power plant, wherein the power is delivered directly by the turbine driving the compressor;

FIG. 2 is a similar showing of a gas turbine power plant, wherein a separate power turbine is arranged in series with the compressor turbine;

FIG. 3 is a schematic section along line I—I in FIG. 2, showing the path traveled by the intake air and the exhaust gases, and FIG. 4 is a diagrammatic cross-section of a gas turbine power plant, including combustion chambers and turbines arranged in parallel, one of the combustion chambers being disposed in front of the compressor turbine, while the other combustion chamber is disposed ahead of the power turbine.

Referring to the drawings, wherein like elements are denoted by identical reference numerals, and first to FIG. 1, a shaft 1 mounts a compressor 2 and a compressor turbine 3. Air entering through the intake 4 is compressed in the compressor 2 and through conduits 5, is conveyed to the drum-shaped heat exchanger 6 which is designed to operate on the regeneration principle. After passing through the heat exchanger 6, the heated air enters, through aperture 7 in the bottom 8 of the combustion chamber, into the annular combustion chamber 9. Fuel is injected into the combustion chamber 9 in a well known manner. The working medium generated in the chamber passes through the tubular bend 10, into the turbine 3. The power is delivered by the shaft 1. Thus, in this embodiment of the invention the power delivery is effected directly from the compressor turbine 3. Following their expansion, the combustion gases pass through the exhaust stack 11, which has only a single bend, into the heat exchanger 6 and from here, into the discharge conduit 12.

In the embodiment of the invention according to FIG. 2, the shaft 21 mounts the compressor 22 and the compressor turbine 23. Another shaft 24 mounts the power turbine 25, which thus is mechanically separated from the compressor turbine 23.

In close analogy to conditions prevailing in the embodiment of the invention according to FIG. 1, the intake air conveyed by the compressor 22, on leaving the heat exchanger 26, enters the annular combustion chamber 27, where fuel injection takes place. The working medium discharged from the annular combustion chamber 27 passes successively the compressor turbine 23 and the power turbine 25, yielding the energy required for the operation of these turbines. As in FIG. 1, the expanded gases pass the exhaust stack 28, which has only a single bend, to be conveyed to the heat exchanger 26. The useful power, in the embodiment of FIG. 2, is delivered by the shaft 24, and derives from the power turbine 25 which is connected in series with the compressor turbine 23.

FIG. 3 illustrates, for the embodiment of the invention according to FIG. 2, the paths traveled by the intake air and the exhaust gases, respectively. The intake air, in the course of travel from the compressor 22 to the combustion chamber 27, moves, in radial direction, inwardly, whereas the exhaust gases, on leaving the turbine 25, move, in radial direction, outwardly.

In the embodiment of the invention according to FIG. 4, the power turbine 31 is mechanically separated from the compressor turbine 32, the same as in FIG. 2. According to FIG. 4, however, the two turbines 31 and 32 are not arranged in series, as in FIG. 2, but are arranged in parallel, the turbine 31 being mounted on the shaft 33 while the turbine 32 is mounted on the shaft 34. The arrangement in parallel is such that a single heat exchanger 35 is provided for both turbines, but two annular combustion chambers 36 and 37 are correlated with the heat exchanger 35. The intake air compressed by the compressor 38 is conveyed, through conduits 39 and 40, to the heat exchanger 35 from where it passes to the combustion chambers 36 and 37. Once the working medium has done its work, the expanded gases pass through the exhaust conduits 41 or 42 which have only a single bend, into the single heat exchanger 35 provided for both turbines, to then pass into the collector main 43. In this embodiment of the invention, the useful power is taken off the shaft 33 mounting the power turbine 31 which is arranged in parallel to the compressor turbine 32.

I wish it to be understood that I do not desire to be limited to the exact details of design, construction or operation shown or described, as a number of modifications within the scope of the annexed claim, and involving no departure from the spirit of the invention nor any sacrifice of the advantages thereof, are likely to occur to workers in this field.

I claim:

A gas turbine power plant comprising a compressor, a first turbine driving said compressor, a second power turbine, a first annular combustion chamber surrounding said first turbine, a second annular combustion chamber surrounding said second turbine, a first axial shaft for mounting said first turbine, a second axial shaft for mounting said second turbine, said first and second shafts being separated from each other and lying on a common axis of said power plant, a single heat exchanger mounted in between said first and second turbines serving as a common heat exchanger for both combustion chambers and the output gases of both turbines, first conduit means leading inlet air from the compressor to the heat exchanger before sending the air to the combustion chambers, a split duct from said heat exchanger leading heated air to both of said annular combustion chambers, a second conduit for conveying combustion gases from the first combustion chamber into said compressor turbine, a third conduit connecting said first turbine to said heat exchanger to convey combustion gases from the first turbine to said exchanger, a fourth conduit between said second combustion chamber and said power turbine to convey combustion gases to said power turbine and a fifth conduit from said power turbine to said heat exchanger to convey combustion gases from said power turbine to said heat exchanger.

References Cited in the file of this patent

UNITED STATES PATENTS

| | | |
|---|---|---|
| 2,895,296 | Hryniszak | July 21, 1959 |
| 2,969,644 | Williams et al. | Jan. 31, 1961 |

FOREIGN PATENTS

| | | |
|---|---|---|
| 824,080 | France | Nov. 3, 1937 |
| 478,688 | Great Britain | Jan. 24, 1938 |
| 710,959 | Great Britain | June 23, 1954 |
| 724,176 | Great Britain | Feb. 16, 1955 |
| 724,177 | Great Britain | Feb. 16, 1955 |
| 459,368 | Italy | Sept. 5, 1950 |
| 460,819 | Italy | Dec. 21, 1950 |
| 228,285 | Switzerland | Nov. 1, 1943 |

OTHER REFERENCES

Germany printed application 1,011,672 printed July 4, 1957 (KL 46F 11).